United States Patent [19]
Lee

[11] Patent Number: 5,673,339
[45] Date of Patent: Sep. 30, 1997

[54] METHOD FOR ENCODING A VIDEO SIGNAL USING FEATURE POINT BASED MOTION ESTIMATION

[75] Inventor: Min-Sup Lee, Seoul, Rep. of Korea

[73] Assignee: Daewoo Electronics Co., Ltd., Seoul, Rep. of Korea

[21] Appl. No.: 509,313

[22] Filed: Jul. 31, 1995

[30] Foreign Application Priority Data

Mar. 20, 1995 [KR] Rep. of Korea .......... 95-5858

[51] Int. Cl.⁶ .............. G06K 9/36; H04N 1/41
[52] U.S. Cl. .......... 382/236; 382/232; 382/243; 348/416; 348/699
[58] Field of Search ............ 382/232, 236, 382/241, 243; 348/699, 700, 701, 399, 400, 401, 402, 409, 415, 413, 416, 407, 430, 431; 358/430, 433

[56] References Cited

U.S. PATENT DOCUMENTS

| | | | |
|---|---|---|---|
| 5,089,887 | 2/1992 | Robert et al. | 358/105 |
| 5,295,201 | 3/1994 | Yokohama | 382/236 |
| 5,486,862 | 1/1996 | Yagasaki | 348/399 |
| 5,548,667 | 8/1996 | Tu | 382/285 |
| 5,552,823 | 9/1996 | Kageyama | 348/155 |

Primary Examiner—Leo Boudreau
Assistant Examiner—Wenpeng Chen
Attorney, Agent, or Firm—Anderson, Kill & Olick P.C.

[57] ABSTRACT

A method for providing an accurately predicted current frame, comprising the steps of: selecting feature points in the previous frame and detecting a first set of motion vectors for the feature points; defining quadrangles by connecting the feature points; defining horizontally split triangles by splitting quadrangles and calculating a variance for each triangle and comparing the variance to select the smallest variance as first variance; defining vertically split triangles by splitting the quadrangles and calculating the variance for each triangle and comparing the variance to select the smallest variance value as second variance value; comparing the first and the second variance and selecting the smaller variance as a third variance and providing triangle information representing the split direction for the third variance; determining quasi-feature points on the current frame and a second set of motion vectors for the quasi-feature points; defining quadrangles formed by connecting the quasi-feature points, and splitting each quadrangle into two triangles; determining a predicted position on the previous frame for pixel contained in triangle of the current frame; determining a third set of motion vectors for the pixels contained in triangle of the current frame; and providing value of each pixel to be contained in the predicted current frame by using the second and the third set of motion vectors.

1 Claim, 7 Drawing Sheets

METHOD FOR ENCODING A VIDEO SIGNAL USING FEATURE POINT BASED MOTION ESTIMATION

FIELD OF THE INVENTION

The present invention relates to a method for encoding a video signal; and, more particularly, to a method which is capable of effectively encoding the video signal by providing an accurately predicted current frame.

DESCRIPTION OF THE PRIOR ART

As is well known, transmission of digitized video signals can attain video images of a much higher quality than the transmission of analog signals. When an image signal comprising a sequence of image "frames" is expressed in a digital form, a substantial amount of data is generated for transmission, especially in the case of a high definition television system. Since, however, the available frequency bandwidth of a conventional transmission channel is limited, in order to transmit the substantial amounts of digital data therethrough, it is inevitable to compress or reduce the volume of the transmission data. Among various video compression techniques, the so-called hybrid coding technique, which combines temporal and spatial compression techniques together with a statistical coding technique, is known to be most effective.

Most hybrid coding techniques employ a motion compensated DPCM(differential pulse coded modulation), two-dimensional DCT(discrete cosine transform), quantization of DCT coefficients, and VLC(variable length coding). The motion compensated DPCM is a process of estimating the movement of an object between a current frame and a previous frame, and predicting the current frame according to the motion flow of the object to produce an error signal representing the difference between the current frame and its prediction. This method is described, for example, in Staffan Ericsson, "Fixed and Adaptive Predictors for Hybrid Predictive/Transform Coding", *IEEE Transactions on Communications*, COM-33, No. 12 (December 1985); and in Ninomiya and Ohtsuka, "A Motion-Compensated Interframe Coding Scheme for Television Pictures", *IEEE Transactions on Communications*, COM-30, No. 1 (January 1982).

The two-dimensional DCT, which reduces or makes use of spatial redundancies between image data, converts a block of digital image data, for example, a block of 8×8 pixels, into a set of transform coefficient data. This technique is described in, e.g., Chen and Pratt, "Scene Adaptive Coder", *IEEE Transactions on Communications*, COM-32, No. 3(March 1984). By processing such transform coefficient data with a quantizer, zigzag scanning and VLC, the amount of data to be transmitted can be effectively compressed.

Specifically, in the motion compensated DPCM, current frame data is predicted from the corresponding previous frame data based on an estimation of the motion between the current and the previous frames. Such estimated motion may be described in terms of two dimensional motion vectors representing the displacement of pixels between the previous and the current frames.

There have been two basic approaches to estimate the displacement of pixels of an object: one is a block-by-block estimation and the other is a pixel-by-pixel approach.

In the block-by-block motion estimation, a block in a current frame is compared with blocks in its previous frame until a best match is determined. From this, an interframe displacement vector (representing how much the block of pixels has moved between the frames) for the whole block can be estimated for the current frame being transmitted. However, in the block-by-block motion estimation, poor estimates may result if all pixels in the block do not move in a same way, to thereby decrease the overall picture quality.

Using a pixel-by-pixel approach, on the other hand, a displacement is determined for each and every pixel. This technique allows a more exact estimation of the pixel value and has the ability to easily handle scale changes (e.g., zooming, movement perpendicular to the image plane). However, in the pixel-by-pixel approach, since a motion vector is determined for each and every pixel, it is virtually impossible to transmit all of the motion vector data to a receiver.

One of the techniques introduced to ameliorate the problem of dealing with the surplus or superfluous transmission data resulting from the pixel-by-pixel approach is a feature point-based motion estimation method.

In the feature point-based motion estimation technique, motion vectors for a set of selected pixels, i.e., feature points, are transmitted to a receiver, wherein the feature points are defined as pixels of a previous frame or a current frame capable of representing a motion of an object so that the entire motion vectors for the pixels in the current frame can be recovered or approximated from those of the feature points at the receiver. In an encoder which adopts the motion estimation technique based on feature points as disclosed in a commonly owned copending application, U.S. Ser. No. 08/367,520, entitled "Method and Apparatus for Encoding a Video Signal Using Pixel-by-Pixel Motion Estimation", a number of feature points are first selected from the pixels contained in the previous frame. Then, motion vectors for the selected feature points are determined through the use of a conventional block matching technique, wherein each of the motion vectors represents a spatial displacement between one feature point in the previous frame and a corresponding matching point, i.e., a most similar pixel, in the current frame. Specifically, the matching point for each of the feature points is searched in a search region within the current frame, wherein the search region is defined as a region of a predetermined area which encompasses the current frame position that corresponds to the location of the feature point in the previous frame. Those pixels in the current frame corresponding to the feature points in the previous frame are called quasi-feature points. The spatial displacement from a quasi-feature point in the current frame to its corresponding feature point in the previous frame is called the quasi-feature point's motion vector.

Thereafter, motion vectors for the remaining pixels in the current frame are determined based on the motion vectors of these quasi-feature points. Specifically, the current frame is divided into polygons, e.g., triangle, with the quasi-feature points forming the apexes. Lines are drawn from each quasi-feature point to other quasi-feature points, making sure that they do not intersect, in such a way that the entire frame is divided into the polygons. The pixels inside each of these polygons are given motion vectors derived from the motion vectors of the quasi-feature points that form the apexes. Then, the value of each pixel to be included in a predicted current frame is provided by means of the motion vector assigned to each pixel in the current frame. The predicted current frame is thus formed by assigning the pixel value of each corresponding pixel in the previous frame to each pixel in the current frame.

However, dividing frames into polygons in a predetermined manner is undesirable from an accuracy standpoint as the motion vectors for pixels forming a certain part of an object may be identical, and yet there is a possibility that different motion vectors might be assigned to those pixels if they are included in different polygons. Consequently, assignment of such false motion vectors to certain pixels in the current frame may result in the deterioration of the overall coding efficiency.

SUMMARY OF THE INVENTION

It is, therefore, a primary object of the invention to provide an improved video signal encoding method which is capable of effectively encoding the video signal by providing an accurately predicted current frame.

In accordance with the present invention, there is provided a method, for use in a video signal encoder, for effectively encoding a digital video signal based on a feature point-based motion estimation technique, said digital video signal having a plurality of frames including a current frame and a previous frame, by providing an accurately predicted current frame, comprising the steps of: (a) selecting a multiplicity of pixels in the previous frame as feature points and detecting a first set of motion vectors for the feature points between the current frame and the previous frame, said feature points representing motions of objects in the digital video signal; (b) defining non-overlapping quadrangles by line segments connecting the feature points; (c) defining horizontally split triangles by splitting each of the quadrangles in a horizontal direction and calculating a variance value of the pixel values for each of the horizontally split triangles and comparing the variance values for all the horizontally split triangles to select, as a first variance value, the smallest variance value; (d) defining vertically split triangles by splitting each of the quadrangles in a vertical direction and calculating the variance value of the pixel values for each of the vertically split triangles and comparing the variance values for all the vertically split triangles to select, as a second variance value, the smallest variance value; (e) comparing the first and the second variance values and selecting, as a third variance value, the smaller variance value and providing triangle information representing the split direction for the triangle having the third variance value; (f) determining a multiplicity of quasi-feature points on the current frame and a second set of motion vectors for the quasi-feature points based on the feature points and the motion vectors thereof; (g) defining non-overlapping quadrangles formed by line segments connecting the quasi-feature points, wherein four of the quasi-feature points corresponding to four feature points forming one quadrangle in the previous frame form one quadrangle in the current frame, and splitting, in response to the triangle information, each of the quadrangles into two triangles; (h) determining a predicted position on the previous frame for each pixel contained in each triangle of the current frame based on positional relationships between the quasi-feature points forming said each triangle and their corresponding feature points; (i) determining a third set of motion vectors for the pixels contained in each triangle of the current frame based on the displacement between a pixel position and its predicted position; and (j) providing a value of each of the pixels to be contained in the predicted current frame by using each of the second and the third sets of motion vectors.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
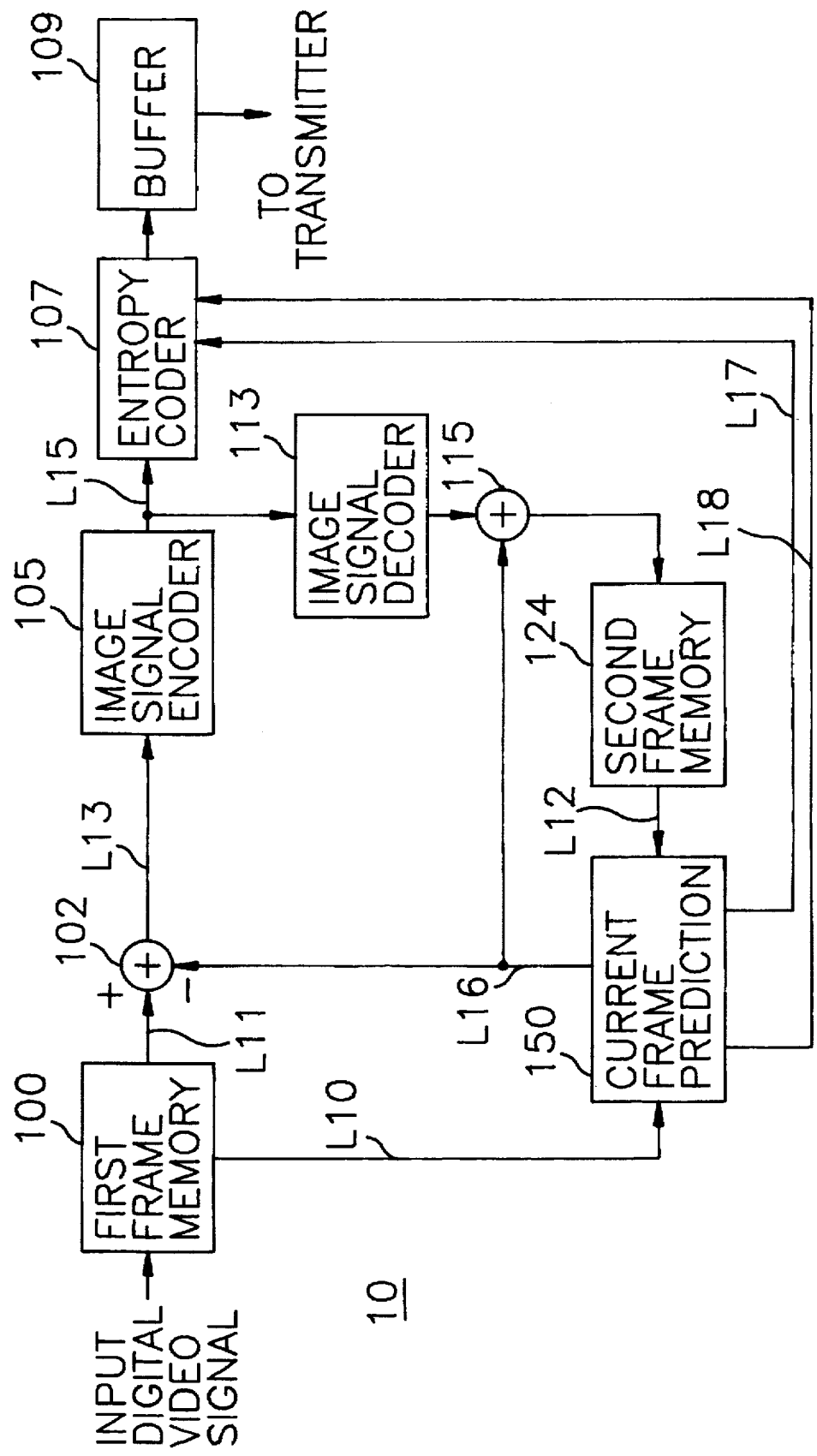
FIG. 1 sets forth a block diagram of a video signal encoding apparatus in accordance with the present invention.

Referring to FIG. 1, there is shown a block diagram of a video signal encoding apparatus 10 in accordance with the present invention. An input digital video signal is stored as a current frame signal in a first frame memory 100 which is connected to a subtractor 102 through a line L11 and to a current frame prediction block 150 through a line L10.

At the current frame prediction block 150, a current frame signal on the line L10 retrieved from the first frame memory 100 and a previous frame signal on a line L12 from a second frame memory 124 are processed to predict the current frame on a pixel-by-pixel basis to generate a predicted current frame signal onto a line L16, triangle information onto a line L17, which represents the formation of triangles employed in generating the predicted current frame signal, and a set of motion vectors for feature points onto a line L18. Details of the current frame prediction block 150 will be described with reference to FIGS. 2 and 9.

The predicted current frame signal on the line L16 is subtracted from a current frame signal on a line L11 at the subtractor 102, and the resultant data, i.e., the error signal denoting the differential pixel values between the current frame and the predicted current frame, is dispatched to an image signal encoder 105, wherein the error signal is encoded into a set of quantized transform coefficients by using, e.g., a DCT and any of the known quantization methods.

Thereafter, the quantized transform coefficients are transmitted to an entropy coder 107 and an image signal decoder 113. At the entropy coder 107, the quantized transform coefficients from the image signal encoder 105, the triangle information transmitted via the line L17 and the motion vectors transmitted through the line L18 are coded together by using, e.g., a variable length coding technique; and transmitted at a constant transmission rate through a buffer 109 to a transmitter(not shown) for the transmission thereof. In the meantime, the image signal decoder 113 converts the quantized transform coefficients from the image signal encoder 105 back into a reconstructed error signal by employing an inverse quantization and an inverse discrete cosine transform.

The reconstructed error signal from the image signal decoder 113 and the predicted current frame signal on the line L16 from the current frame prediction block 150 are combined at an adder 115 to thereby provide a reconstructed current frame signal to be stored in the second frame memory 124 as a previous frame for a next frame. Reconstruction of the error signal is required in order for the encoder to monitor the behavior of the decoder in a receiver to thereby prevent the current frame signal reconstructed at the encoder from diverging from that of the decoder in the receiver.

Figure 2:
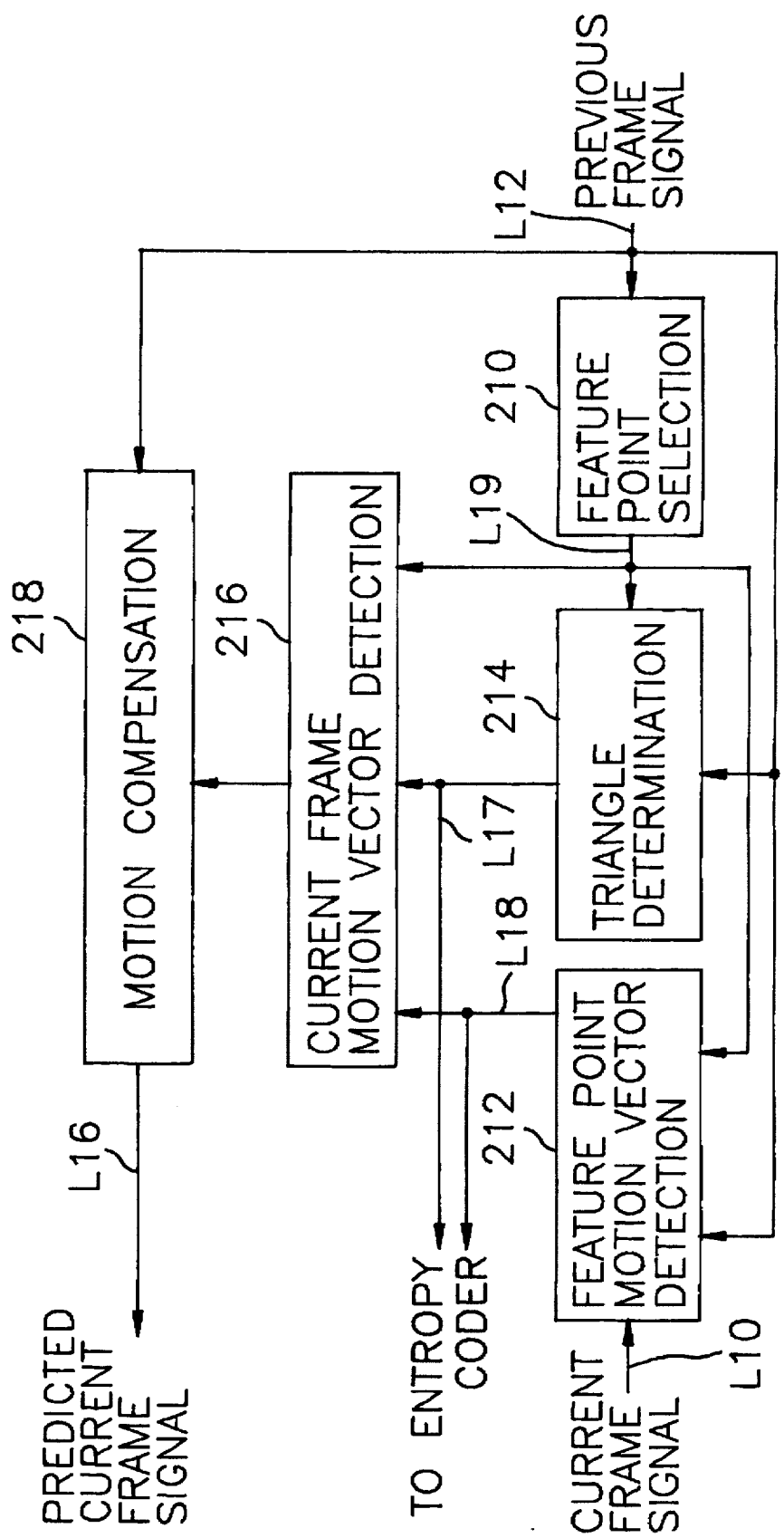
FIG. 2 shows a detailed block diagram of the current frame prediction block of FIG. 1.

Referring to FIG. 2, there are illustrated the details of the current frame prediction block 150 shown in FIG. 1. As shown in FIG. 2, a previous frame signal on the line L12 from the second frame memory 124 is inputted to a feature point selection block 210, a feature point motion vector detection block 212, a triangle determination block 214 and a motion compensation block 218.

Figure 3:
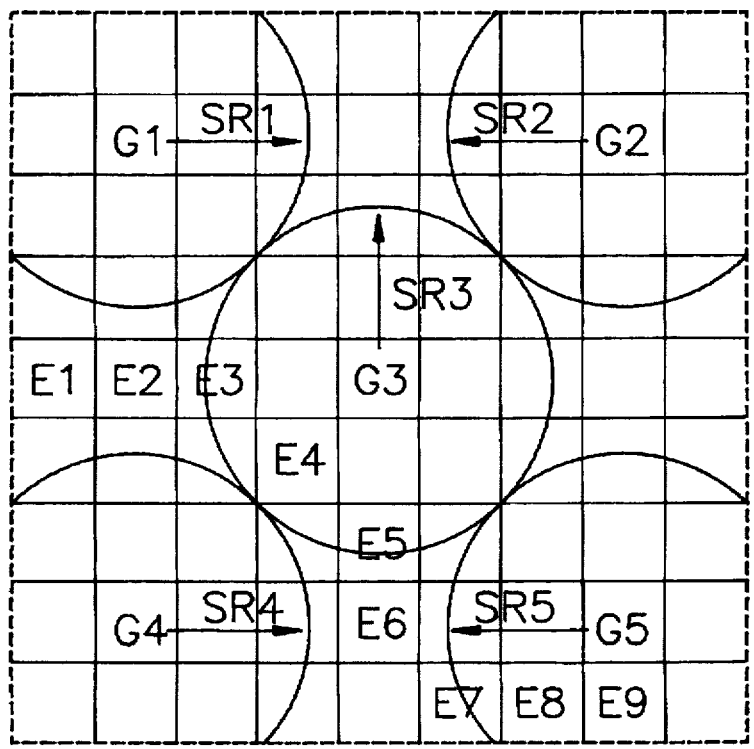
FIG. 3 illustrates an explanatory diagram of the feature point selection operation in accordance with the present invention.

At the feature point selection block 210, a number of feature points are selected among the pixels contained in the previous frame. The feature points are defined as pixels which are capable of representing the motions of objects in the frame. Generally, in feature point determination, a grid technique employing various types of grids, e.g., a rectangular grid or a hexagonal grid, is used, wherein the feature points are located at the nodes of the grids. In a preferred embodiment of the present invention, an edge detection technique is employed together with such grid technique. Referring to FIG. 3, there is an explanatory diagram depicting the feature point selection process carried out at the feature point selection block 210. First, the rectangular grid is generated on the previous frame and the largest and non-overlapping circular search ranges, e.g., SR1 to SR5, are set for the respective rectangular grid points therein, e.g., G1 to G5. In the meantime, edge points in the previous frame are detected by using a conventional gradient operator, e.g., a sobel operator. For instance, directional gradients, e.g., horizontal and vertical gradients $G_x(x,y)$ and $G_y(x,y)$ at a pixel location(x,y), are calculated by using the horizontal and the vertical sobel operators, and a gradient magnitude $g(x,y)$ at the pixel location(x,y) may be obtained as:

$$g(x, y)=|G_x(x, y)|+|G_y(x,y)|.$$

Figure 4:
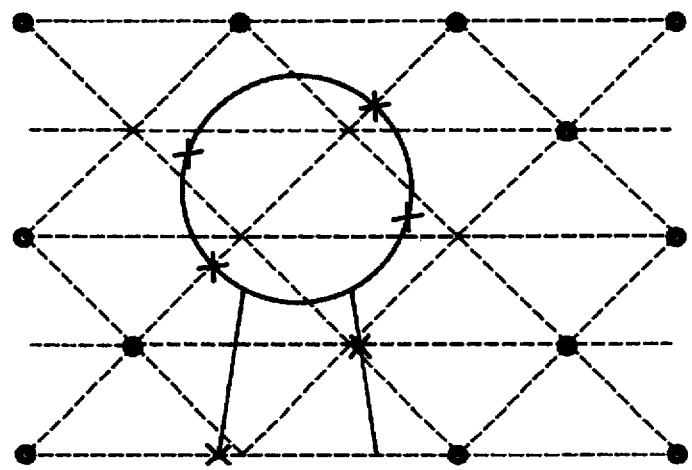
FIG. 4 provides an explanatory diagram of the selected feature points in a previous frame.

Then, the edge points in the previous frame are detected by comparing the gradient magnitude $g(x,y)$ for each pixel in the previous frame with a predetermined threshold value Te. That is, the pixel location (x,y) becomes an edge point if $g(x,y)$ exceeds Te. Thereafter, based on the gradient magnitude for the edge points and the edge signal representing the positions of the edge points, a block of, e.g., 5×5, pixels having an edge point at the center thereof is set up, for each of the edge points, e.g., E1 to E9, which overlaps with the search ranges. The gradient magnitudes of the pixels included in each of the blocks are then summed up and the summation value obtained is assigned as the edge value for the edge point at the center thereof; and the edge point having a maximum edge value in the search range is selected as the feature point of the search range. If more than one edge point have the same maximum edge value, then the edge point nearest to the grid point is selected as the feature point. And if no edge points are found in a search range, e.g., SR1, SR2 or SR4, the grid point itself, e.g., G1, G2 or G4, included in the search range is selected as a feature point. In FIG. 4, the feature points in the previous frame selected as above are shown exemplarily, wherein the dots are the grid points selected as the feature points, and the X's are the edge points selected as the feature points.

Referring back to FIG. 2, the feature point information regarding the positions of the selected feature points from the feature point selection block 210 is inputted into the feature point motion vector detection block 212, a triangle determination block 214 and a current frame motion vector detection block 216. The current frame signal on the line L10 is provided to the feature point motion vector detection block 212.

At the feature point motion vector detection block 212, a first set of motion vectors for the selected feature points is detected. Each of the motion vectors in the first set represents a spatial displacement between a feature point in the previous frame and a most similar pixel thereto in the current frame. After detecting the motion vectors for all of the feature points, the first set of motion vectors is provided to a current frame motion vector detection block 216 and the entropy coder 107(shown in FIG. 1) via the line L18.

Figure 5:
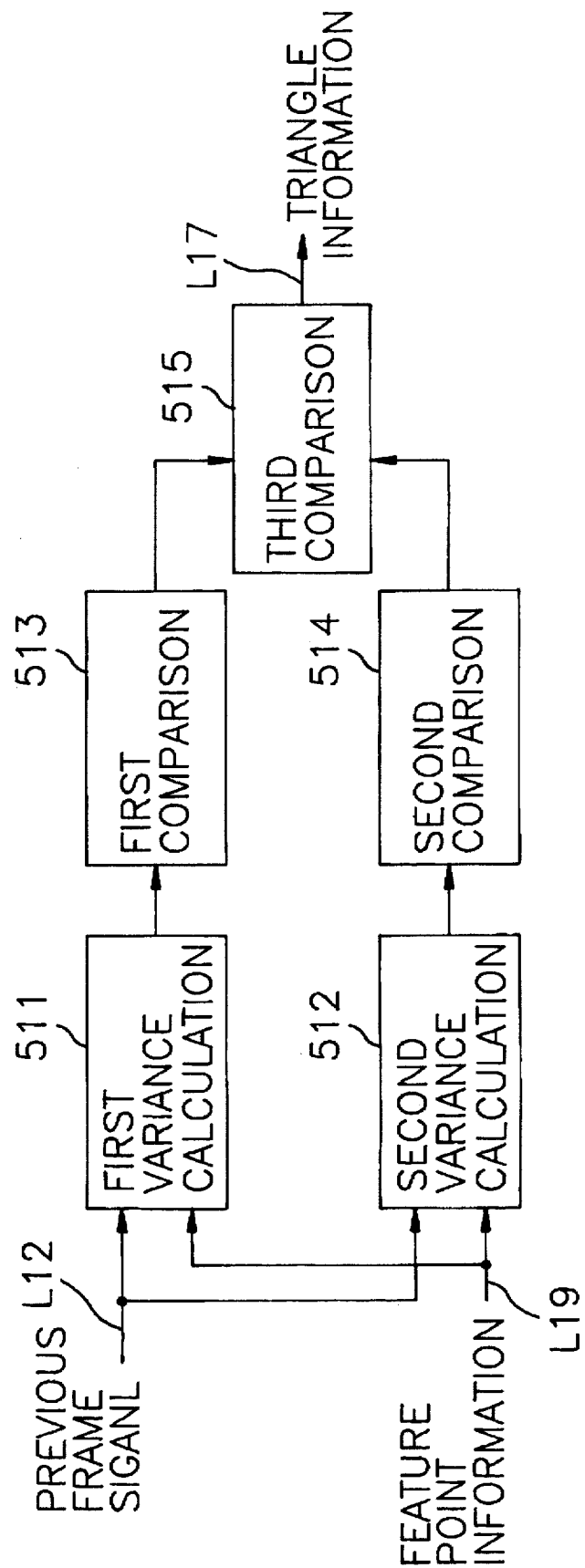
FIG. 5 describes a detailed block diagram of the triangle determination block of FIG. 2.

In the meantime, referring to FIG. 5, the triangle determination block 214 determines the triangle forming method as follows.

Figure 6:
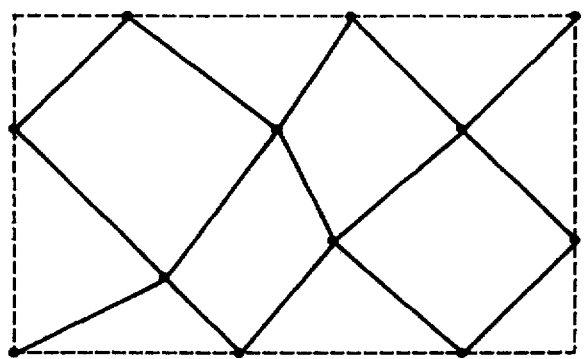
FIG. 6 presents a diagram showing a number of quadrangles in the current frame.
Figure 7A:
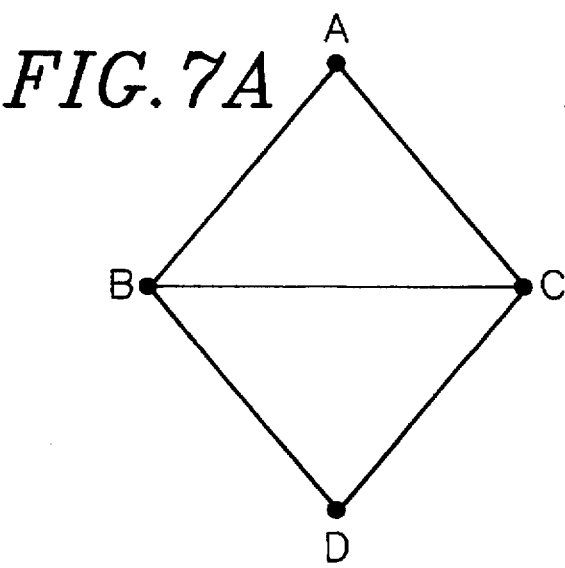
FIG. 7A to 7C exemplify the triangle splitting operation in accordance with the present invention.
Figure 7B:
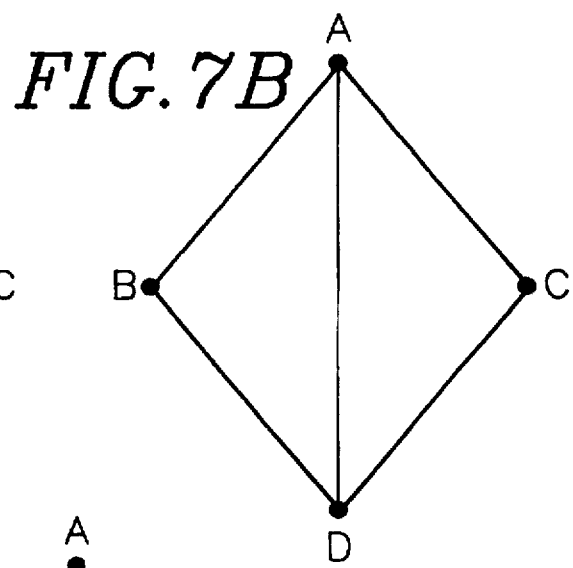

The previous frame signal on the line L12 and the feature point information on the line L19 are provided to a first and a second variance calculation blocks 511 and 512. At the first and the second variance calculation blocks 511 and 512, a plurality of non-overlapping quadrangles are defined by connecting, e.g., four neighboring feature points as shown in FIG. 6. Then, as shown in FIG. 7A or 7B, each of the quadrangles is split in a horizontal or a vertical direction by adding a new line segment, e.g., BC or AD, between the horizontal or the vertical neighboring feature points to generate two triangles for each of the quadrangles. The first and the second variance calculation blocks 511 and 512 then calculate the variance values of the pixel values in each of the triangles.

In the preferred embodiment of the invention, the first variance calculation block 511 splits each of the quadrangles in the horizontal direction by adding the new line segment BC as shown in FIG. 7A and calculates the variance value of the pixel values for each of the triangles and provides it to a first comparison block 513. In the meantime, the second variance calculation block 512 splits each of the quadrangles in the vertical direction by adding the new line segment AD as shown in FIG. 7B and calculates the variance value of the pixel values for each of the triangles and provides it to a second comparison block 514.

The first comparison block 513 compares the two variance values for the two triangles from the first variance calculation block 513 to thereby provide the smaller variance value to a third comparison block 515. The second comparison block 514 performs the same function as the first comparison block 513. That is, the second comparison block 514 compares the two variance values for the two triangles from the second variance calculation block 512 and then provides the smaller variance value to the third comparison block 515.

Figure 7C:
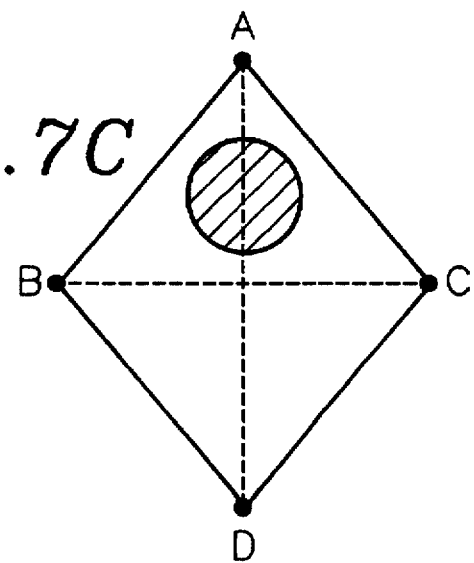

The third comparison block 515 compares the two variance values from the first and the second comparison blocks 513 and 514 and selects the triangle forming method, i.e., horizontal or vertical division of the quadrangle, that yields the smaller variance value and provides, as the triangle information, this triangle forming method to a current frame motion vector detection block 216 shown in FIG. 2 and the entropy coder 107 shown in FIG. 1. The smaller the variance value of the pixel values in the triangle, the larger the probability that there is either no object in the triangle, or that all or the majority of the pixels in the triangle belong to a same object. For instance, if one object is in the horizontally split triangle ABC as shown in FIG. 7C, the variance value of the pixel values in the triangle BCD is the smallest among the horizontally and vertically split triangles, i.e., four triangles ABC, BCD, ABD and ACD. Accordingly, the third comparison block 515 provides the triangle information representing the horizontal split method.

It should be noted that four variance values from the first and the second variance calculation blocks 511 and 512 can be compared simultaneously and the smallest variance value is selected therefrom so that the triangle information corresponding thereto is provided.

Referring back to FIG. 2, the current frame motion vector detection block 216 receives the feature point information from the feature point selection block 210 via the line L19, the feature point motion vectors from the feature point motion vector detection block 212 via the line L18 and the triangle information from the triangle determination block 214. At the current frame motion vector detection block 216, the motion vectors for all of the pixels in the current frame are determined. First, a second set of motion vecters for "quasi-feature points", which represent the pixel points of the current frame shifted from the feature points of the previous frame by the first set of motion vectors, is determined. The magnitude of a motion vector for a quasi-feature point is identical to that of the motion vector for its corresponding feature point, but with an opposite direction. After determining the motion vectors for all of the quasi-feature points, a third set of the motion vectors for non-quasi-feature points, which are the remaining pixel points in the current frame, is determined as follows.

A plurality of non-overlapping quadrangles is defined by the line segments connecting the quasi-feature points, wherein four quasi-feature points corresponding to four feature points forming one quadrangle in the previous frame form one quadrangle in the current frame as well and, in response to the triangle information, each of the quadrangles is split into two triangles. And then, a predicted position on the previous frame for each pixel contained in each triangle of the current frame is determined based on the positional relationships between the quasi-feature points forming said each triangle and their corresponding feature points. Thereafter, a motion vector for said each of the pixels contained in each triangle of the current frame is determined from the displacement between the pixel and its prediction. In the meantime, the motion vectors for the pixels not included in any triangle are set to zeros. This technique is described, for example, in a commonly owned copending application, U.S. Ser. No. 08/434,808, filed on May 4, 1995, entitled "METHOD AND APPARATUS FOR ENCODING/ DECODING A VIDEO SIGNAL", which is incorporated herein in its entirety by reference.

The motion compensation block 218 retrieves each value of the pixels to be contained in the predicted current frame from the second frame memory 124 by using each of the motion vectors contained in the second and the third sets, thereby providing the predicted current frame signal to a subtractor 102 and an adder 115, as shown in FIG. 1, via the line L16. In case x and y components of a motion vector, i.e., $M_x$ and $M_y$, are not integers, the predicted pixel value can be obtained by interpolating the pixel values of the pixels neighboring the position designated by the motion vector.

Figure 8:
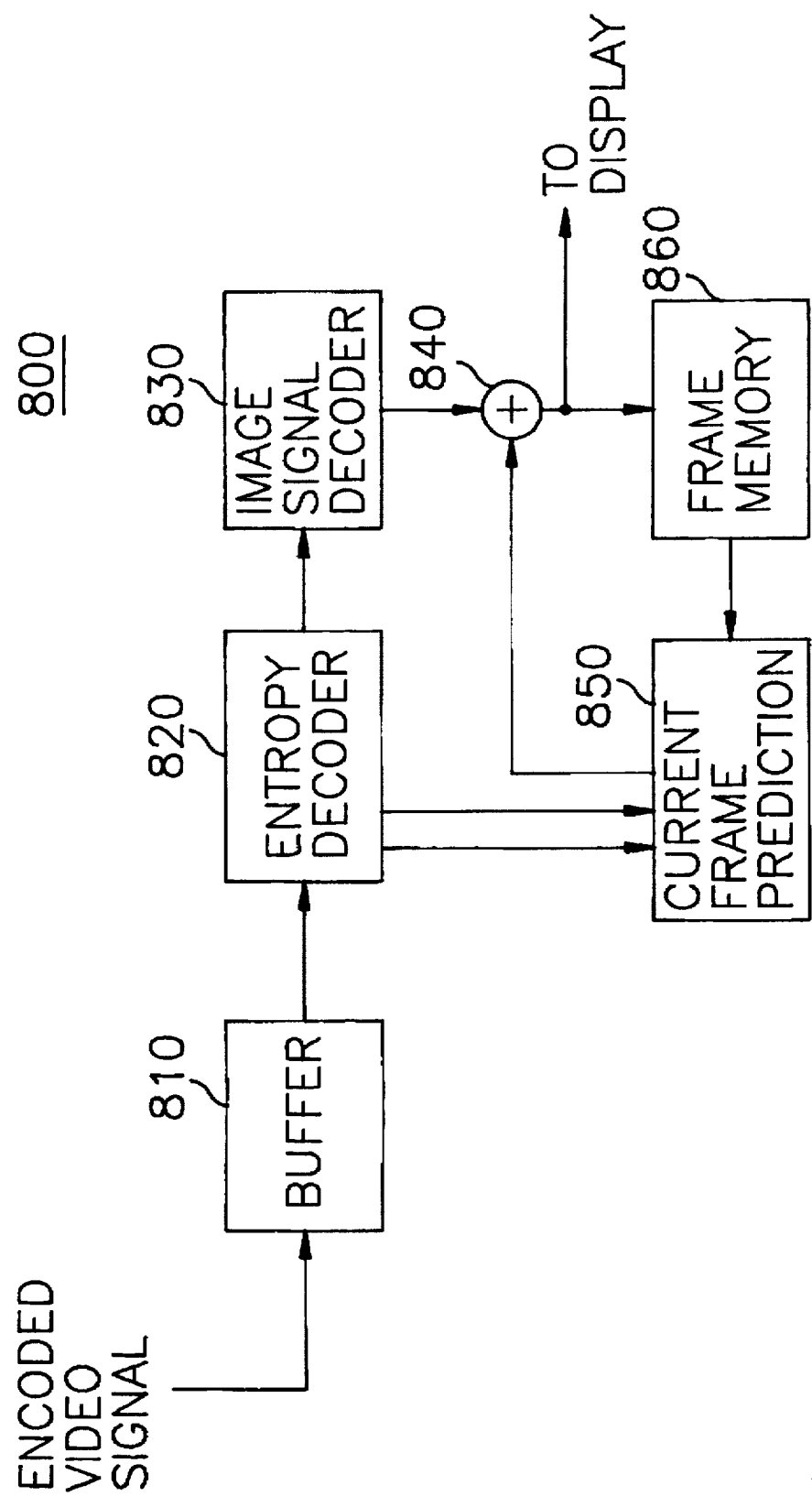
FIG. 8 depicts a block diagram of a video signal decoding apparatus in accordance with the present invention.

Referring to FIG. 8, there is illustrated a video signal decoding apparatus 800 corresponding to the video signal encoding apparatus 10 shown in FIG. 1 of the present invention. An encoded video signal transmitted from the video signal encoding apparatus 10 is fed to an entropy decoder 820 through a buffer 810. Then, the entropy decoder 820 decodes the encoded video signal to provide the feature point motion vectors and the triangle information to a current frame prediction block 850; and the quantized transform coefficients to the image signal decoder 830. The image signal decoder 830 performs the same function as the image signal decoder 113 of the video signal encoding apparatus 10, thereby providing the reconstructed error signal to an adder 840. The current frame prediction block 850 is of a similar structure to that of the current frame prediction block 150 shown in FIG. 2, excepting the triangle determination block and the motion estimator such as the feature point motion vector detection block 212 shown in FIG. 2, because the triangle information and the feature point motion vectors from the encoder 10 shown in FIG. 1 are provided thereto through the entropy decoder 820. The current frame prediction block 850 includes a feature point selection block, a current frame motion vector detection block and a motion compensation block whose functions are similar to those explained with respect to the current frame prediction block 150 above.

Figure 9:
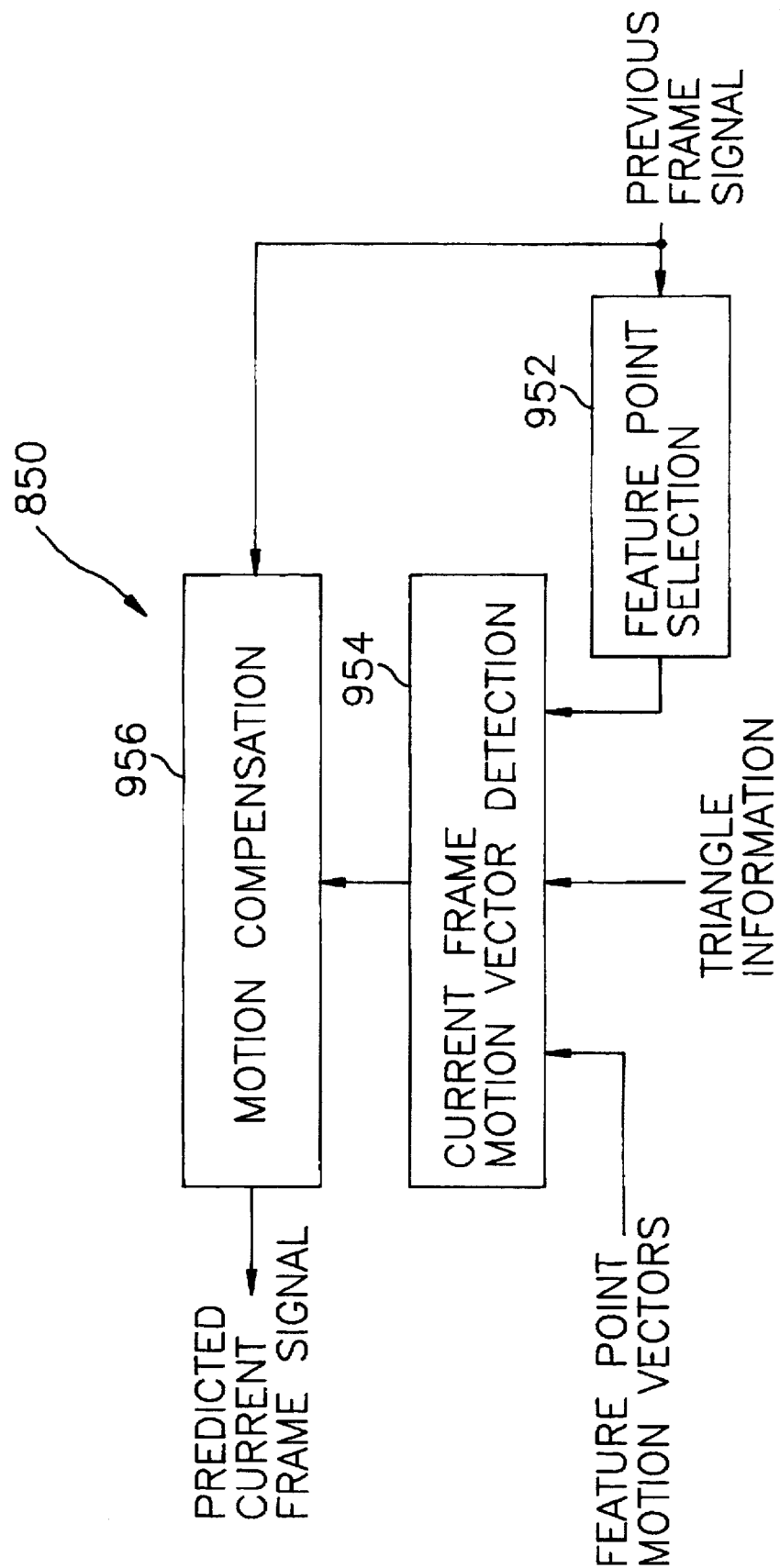
FIG. 9 represents a detailed block diagram of the current frame prediction block shown in FIG. 8.

Specifically, as shown in FIG. 9 which illustrates the details of the current frame prediction block 850, a previous frame signal from a frame memory 860 is inputted to the feature point selection block 952 for selecting a number of feature points, which are identical to those selected at the feature point selection block 210 shown in FIG. 2. In response to the selected feature points from the feature point selection block 952 and the feature point motion vectors and the triangle information from the entropy decoder 820, the current frame motion vector detection block 954 determines the motion vectors for all the pixels contained in the current frame in a same manner as in the current frame motion vector detection block 216 shown in FIG. 2. The motion compensation block 956 provides the predicted current frame signal which is identical to the signal from the motion compensation block 218 shown in FIG. 2.

Referring back to FIG. 8, the predicted current frame signal from the current frame prediction block 850 and the reconstructed error signal from the image signal decoder 830 are added together at the adder 840 to provide the reconstructed current frame signal to a display unit(not shown) and to the frame memory 860. At the frame memory 860, the reconstructed current frame signal is stored as the previous frame signal for use in decoding the next frame.

While the present invention has been shown and described with respect to the particular embodiments, it will be apparent to those skilled in the art that many changes and modifications may be made without departing from the spirit and scope of the invention as defined in the appended claims.

What is claimed is:

1. A method, for use in a video signal encoder, for effectively encoding a digital video signal based on a feature point-based motion estimation technique, said digital video signal having a plurality of frames including a current frame and a previous frame, by providing an accurately predicted current frame, comprising the steps of:

(a) selecting a multiplicity of pixels in the previous frame as feature points and detecting a first set of motion vectors for the feature points between the current frame and the previous frame, said feature points representing motions of objects in the digital video signal;

(b) defining non-overlapping quadrangles by line segments connecting the feature points;

(c) defining horizontally split triangles by splitting each of the quadrangles in a horizontal direction and calculating a variance value of the pixel values for each of the horizontally split triangles and comparing the variance values for all the horizontally split triangles to select, as a first variance value, the smallest variance value;

(d) defining vertically split triangles by splitting each of the quadrangles in a vertical direction and calculating the variance value of the pixel values for each of the vertically split triangles and comparing the variance values for all the vertically split triangles to select, as a second variance value, the smallest variance value;

(e) comparing the first and the second variance values and selecting, as a third variance value, the smaller variance value and providing triangle information representing the split direction for the triangle having the third variance value;

(f) determining a multiplicity of quasi-feature points on the current frame and a second set of motion vectors for the quasi-feature points based on the feature points and the motion vectors thereof;

(g) defining non-overlapping quadrangles formed by line segments connecting the quasi-feature points, wherein four of the quasi-feature points corresponding to four feature points forming one quadrangle in the previous frame form one quadrangle in the current frame, and splitting, in response to the triangle information, each of the quadrangles into two triangles;

(h) determining a predicted position on the previous frame for each pixel contained in each triangle of the current frame based on positional relationships between the quasi-feature points forming said each triangle and their corresponding feature points;

(i) determining a third set of motion vectors for the pixels contained in each triangle of the current frame based on the displacement between a pixel position and its predicted position; and (j) providing a value of each of the pixels to be contained in the predicted current frame by using each of the second and the third sets of motion vectors.

* * * * *